US009776727B2

(12) United States Patent
Ellis et al.

(10) Patent No.: US 9,776,727 B2
(45) Date of Patent: Oct. 3, 2017

(54) METHOD OF CONTROLLING A COOLING SYSTEM

(71) Applicant: Rolls-Royce PLC, London (GB)

(72) Inventors: Sean Patrick Ellis, Derby (GB); Rory Douglas Stieger, Derby (GB)

(73) Assignee: ROLLS-ROYCE plc, London (GB)

( * ) Notice: Subject to any disclaimer, the term of this patent is extended or adjusted under 35 U.S.C. 154(b) by 1080 days.

(21) Appl. No.: 14/150,183

(22) Filed: Jan. 8, 2014

(65) Prior Publication Data

US 2014/0318759 A1   Oct. 30, 2014

(30) Foreign Application Priority Data

Feb. 5, 2013 (GB) .................................. 1302015.1

(51) Int. Cl.
*F02C 7/18* (2006.01)
*B64D 33/02* (2006.01)

(52) U.S. Cl.
CPC .............. *B64D 33/02* (2013.01); *F02C 7/185* (2013.01); *F05D 2260/213* (2013.01); *F05D 2270/112* (2013.01); *Y02T 50/676* (2013.01)

(58) Field of Classification Search
CPC .............. F02C 7/185; F05D 2260/213; F05D 2270/112; B64D 33/02
See application file for complete search history.

(56) References Cited

U.S. PATENT DOCUMENTS

| 4,151,710 A | 5/1979 | Griffin et al. |
| 4,958,289 A * | 9/1990 | Sum .......................... F02C 9/58 |
| | | 416/27 |

(Continued)

FOREIGN PATENT DOCUMENTS

| EP | 0584958 A1 | 3/1994 |
| EP | 2275656 A2 | 1/2011 |

(Continued)

OTHER PUBLICATIONS

May 20, 2013 Search Report issued in British Patent Application No. GB1302015.1.

(Continued)

*Primary Examiner* — Craig Kim
*Assistant Examiner* — Michael Sehn
(74) *Attorney, Agent, or Firm* — Oliff PLC

(57) ABSTRACT

A method of controlling an aircraft gas turbine engine cooling system. The cooling system includes a heat exchanger having a first fluid path through which fan air flows, and a second fluid path through which relatively hot compressor air flows. The cooling system includes a valve configurable between an open position corresponding to a first operating mode, where fan air flows through the first path cooling the compressor air in the second path to a lower temperature, and a closed position corresponding to a second operating mode, where fan air may flow through the first path at a reduced rate, thus the compressor air in the second path could be cooled to a lesser extent. The valve is operated in first mode when the aircraft is in a descent mode, or when turbine entry temperature is above a predetermined amount. Otherwise, the valve is operated in second mode.

14 Claims, 3 Drawing Sheets

(56) References Cited

U.S. PATENT DOCUMENTS

| | | | |
|---|---|---|---|
| 5,136,518 A * | 8/1992 | Glover | G05D 1/0623 |
| | | | 244/181 |
| 5,357,742 A | 10/1994 | Miller | |
| 5,468,123 A | 11/1995 | Guimier et al. | |
| 5,553,449 A * | 9/1996 | Rodgers | F02C 7/12 |
| | | | 60/204 |
| 8,205,426 B2 * | 6/2012 | Schilling | F01D 25/14 |
| | | | 244/134 R |
| 2010/0082267 A1 * | 4/2010 | Schimert | G05B 19/4065 |
| | | | 702/34 |
| 2011/0088405 A1 | 4/2011 | Turco | |

FOREIGN PATENT DOCUMENTS

| | | |
|---|---|---|
| WO | WO 95/17591 A1 | 6/1995 |
| WO | WO 2012/125895 A1 | 9/2012 |

OTHER PUBLICATIONS

Jul. 18, 2017 Search Report issued in European Patent Application No. 14150459.7.

* cited by examiner

METHOD OF CONTROLLING A COOLING SYSTEM

FIELD OF THE INVENTION

The present invention relates to a method of controlling a cooling system for a gas turbine engine.

BACKGROUND TO THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The thermodynamic efficiency (i.e. the fuel burn at a given thrust) is determined in part by the temperature of the working fluids entering the high, intermediate and low pressure turbines 16-18 (known as turbine entry temperature, TET). The TET in modern turbines often approaches or exceeds the melting point of the materials used to make the turbine 17, 18, 19. Consequently, cooling air is provided to cool one or more components (such as blades, stators and discs) of one or more turbine stages 16-18 to prevent damage to the components that would otherwise be caused by the high temperature working fluids, or to increase component life.

However, increasing the cooling air mass flow reduces the thermodynamic efficiency of the engine, since the air in the cooling flow is no longer available to do useful work in the thermodynamic cycle. In many cases, the required cooling air mass flow may be relatively high, since the temperature of the compressed cooling air may be high (typically up to around 700° C.).

One proposed solution to help improve cooling efficiency is to cool the cooling air to a lower temperature prior to delivery. Such systems are known as "cooled cooling air" systems.

FIG. 2 shows a schematic representation of a portion of a gas turbine engine 10 centred around the combustor which includes a cooled cooling air system 20. In the system 20, relatively low temperature air provided by the propulsive fan 12 flows through an air to air heat exchanger 22 along a first fluid path 24. Compressed cooling air from the high pressure compressor 14 flows through the heat exchanger 22 along a second fluid path 26 which is in thermal contact with the first fluid path 24. Consequently, the cooling air in the second fluid path 26 is cooled prior to delivery to the components which require cooling.

In current systems, the flow of fan air through the first path 24 is only activated in accordance with one or more predetermined conditions. In one known system, an Electronic Engine Control Unit (EEC) monitors the high pressure compressor delivery temperature, i.e. the temperature of the air in the second fluid path 26 downstream of the heat exchanger. When T30 is above a predetermined value, a valve 30 is actuated such that the fan air flows through the first path 24 to provide the required cooling. The first path 24 may also be used to determine the temperature of the cooling air supply which can be used to control the required flow.

Other types of cooled cooling air systems and concepts are known, such as fuel cooled cooling air, in which engine fuel is used to cool the cooling fluid. Such systems may be operated in a similar manner.

Another important role for cooling systems is to forceably cool the engine after a period of operation in order to help extend an acceptable service life between replacement or overhaul. This requires the engine to be run at low power to provide a "cool down" period, particularly after extended use at high thrust. One way to achieve this is to mandate a running period after landing to provide an air flow through the engine for a sufficient period in order to cool various components. However, this particular approach burns excessive fuel and engines are often shutdown prior to the full cool down period in practice in order to save fuel. This results in deterioration of engine components and a reduced service life of an engine. In either case, increased costs result due to excess fuel burn or reduced service life.

The present invention provides a method of controlling an aircraft gas turbine engine which seeks to overcome some or all of the above problems.

SUMMARY OF THE INVENTION

According to a first aspect of the present invention, there is provided a method of controlling an aircraft gas turbine engine cooling system, the method comprising:
  assessing an aircraft flight mode; and
  operating the cooling system according to a first operating mode when the aircraft is determined to be in a descent mode, wherein the cooling system is configured to provide increased engine cooling when in the first operating mode relative to a second operating mode.

Advantageously, the invention provides a method of operating an aircraft gas turbine engine, in which the cooling arrangement is operated in a first operating mode prior to landing of the aircraft when an aircraft descent mode is detected. Accordingly, the component cooling system can be used to cool the component to a greater extent prior to landing compared to existing methods. As a result, a reduced cooling period or no cooling period is required once the aircraft has landed. Consequently, the aircraft gas turbine engine can be shutdown earlier than would otherwise be possible, thereby reducing fuel burn without reducing the service life of the gas turbine engine. Further, the stress on the cooling system may be less as it will have been operational during flight and so any resulting thermal transients in the system will be reduced. A still further advantage is that the cooling system will be operational in the event that a "go-around" is required prior to landing (i.e. where the thrust is suddenly increased during the descent mode). Consequently, no delay will be incurred in turning the cooling system on in such circumstances, resulting in less deterioration to the cooled engine components.

The cooling system may be operated to provide an increased flow of a cooling fluid or to provide a reduced temperature of a cooling fluid when in the first operating mode relative to the second operating mode.

The aircraft cooling system may comprise a heat exchanger, and the cooling system may be operated to provide a relatively low temperature fluid flow at a first rate through the heat exchanger to cool a relatively higher temperature component cooling fluid when operated in the first operating mode, and to provide a relatively low temperature fluid flow at a reduced rate through the heat exchanger when operated in the second operating mode.

The relatively higher temperature fluid may comprise cooling air provided by a compressor of the gas turbine engine. The relatively low temperature fluid may comprise one of fuel or air, such as fan air.

The flight mode may be determined by assessing one or more inputs. The input may comprise one or more of throttle position, weight on wheels, altitude, aircraft airspeed, aircraft Mach number, wind shear speed, fan inlet total pressure and altitude descent rate. Advantageously, the flight mode can be determined by factors which can be directly monitored by the engine EEC without a requirement for a further indicator being provided by the pilot or the aircraft flight computer, thereby providing automatic switching between the first and second operating modes. Consequently, an engine employing the inventive method can be fitted or retrofitted to any aircraft without modification (and possibly recertification) of the aircraft flight computer.

The aircraft may be determined to be in the descent mode when both a first indicator condition and a second indicator condition are met.

The first indicator condition may be met when any of a flight idle condition, reverse thrust condition, or weight on wheels condition is met.

The flight idle condition may be met when an aircraft throttle is in a flight idle position, the reverse thrust condition may be met when the throttle is in a reverse thrust position, and the weight on wheels condition may be met when there is a weight on one or more aircraft landing gear wheels.

The second indicator condition may be met when each of a predetermined altitude condition, a predetermined aircraft Mach number condition, a predetermined wind shear condition and a predetermined descent rate condition are met.

The predetermined altitude condition may comprise an altitude less than approximately 2000 meters with a 300 meter hysteresis band, the predetermined aircraft mach number condition may comprise a Mach number less than 0.2, the predetermined wind shear condition may comprise a wind shear rate less than approximately 7000 Pascals per second with a hysteresis band of approximately 140 Pascals per second, and the predetermined descent rate condition may comprise a descent rate more than zero meters per second, and may comprise a descent rate of more than zero meters per second for more than approximately 0.5 seconds.

Advantageously, by determining the flight mode on the basis of two independent assessments, each of which may comprise a number of further assessments based on one or more independent inputs, a flight mode can be identified more reliably than by depending on a single assessment based on a single input. In particular, it has been found that the second indicator is a reliable indicator of whether the aircraft is in a descent condition, rather than a transitory low power condition.

The cooling system may be operated in the first mode when one or both of a descent mode condition and a gas turbine entry temperature condition are met. The descent mode condition may be met when the aircraft is determined to be in a descent mode, and the gas turbine entry temperature condition may be met when the gas turbine engine turbine entry temperature (TET) is determined to be above a predetermined value.

Advantageously, the operating method is used in conjunction with existing operating methods, and so the cooling system can be operated in the first mode on the basis of other conditions unrelated to the flight mode of the aircraft.

Alternatively, the aircraft may be determined to be in the descent mode by a signal from an aircraft flight computer.

Advantageously, the method can be integrated with the flight computer to provide a direct determination of the flight mode of the aircraft.

The cooling system is configured to cool one or more of a rotor disc, a turbine blade, a combustor casing and a nozzle guide vane.

According to a second aspect of the present invention there is provided a controller for a gas turbine engine cooling system, the controller being configured to carry out the control method of the first aspect of the present invention.

According to a third aspect of the present invention there is provided an aircraft gas turbine engine cooling system comprising the controller of the second aspect of the present invention.

According to a fourth aspect of the present invention there is provided an aircraft gas turbine engine comprising the cooling system of the third aspect of the present invention.

DETAILED DESCRIPTION

Figure 1:
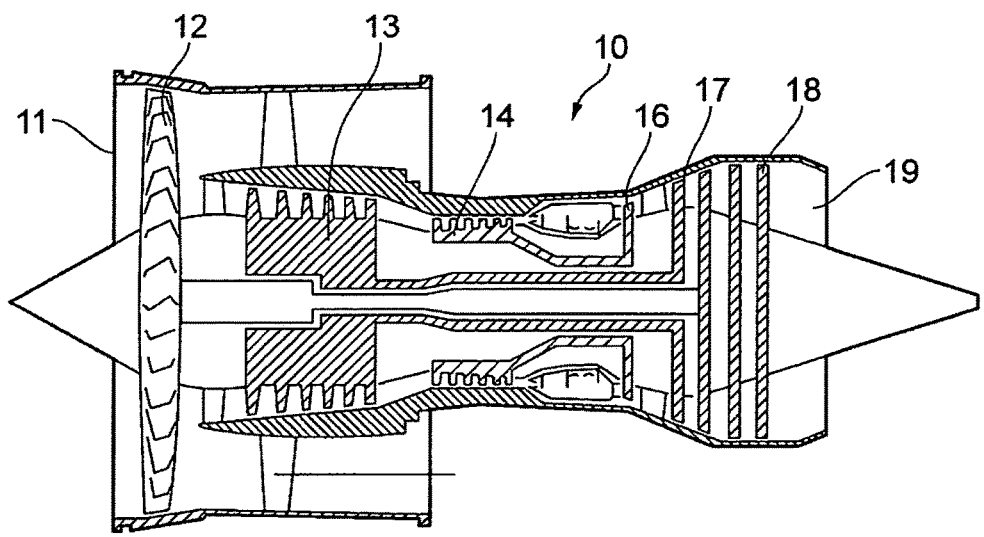
FIG. 1 shows a schematic view of a gas turbine engine.

FIG. 1 shows a gas turbine engine 10 comprising, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

Figure 2:
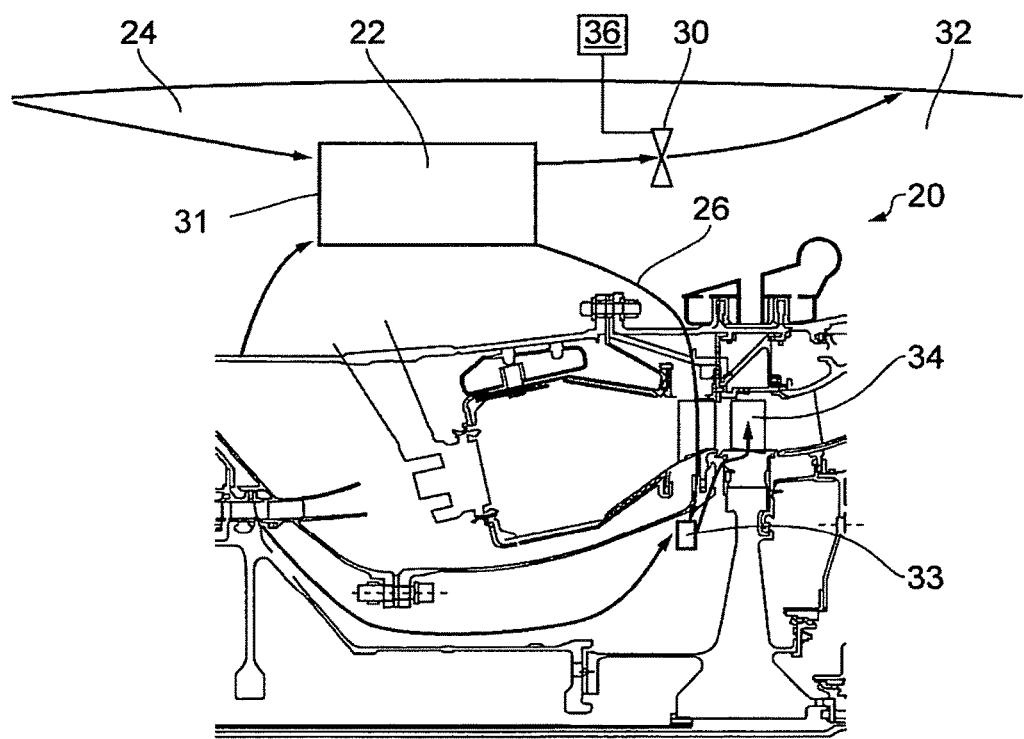
FIG. 2 shows a schematic view of a cooled cooling air system for the gas turbine engine of FIG. 1.

The gas turbine engine 10 comprises a cooling system 20, part of which is shown in FIG. 2. The cooling system 20 comprises an air to air heat exchanger 22. The heat exchanger 22 comprises first 24 and second 26 fluid paths. The first 24 and second 26 fluid paths are in heat exchange relationship within the heat exchanger 22, such that heat can be transferred from the second fluid in the second path 26, to the first fluid in the first path 24, thereby cooling the second fluid. Fan air from the propulsive fan 12 is provided to an intake 31 of the heat exchanger first fluid path 24. The fan air flows along the first path 24, is warmed by fluid flowing through the second path 26, and exits through an outlet 32. Relatively hot (typically up to 700° C.) compressed cooling air from the high pressure compressor 14 flows through the heat exchanger 22 in the second fluid path 26 and is cooled by the fan air flowing through the first fluid path 24, before being delivered to a mixing chamber 33. Hot, un-cooled air from the compressor 14 is then mixed with the cooled air from the first path 24 in the mixing chamber 33 before delivery to a cooled component such as the root of a turbine blade 34. Consequently, the cooling air in the second fluid path 26 is cooled to a lower temperature compared to the relatively hot air from the compressor 14, prior to delivery to the cooled components such as turbine blade 34.

To control the rate of cooling, the cooling system comprises a valve 30 operated by a controller 36. The valve 30 is located downstream of the heat exchanger 22, and is operable to modulate the flow rate of fan air through the first fluid path 24.

The controller 36 is configured to control the valve 30 between an open position corresponding to a first operating mode, in which fan air flows through the first path 24 to cool the compressor air in the second path 26 to a lower temperature, and a closed position corresponding to a second operating mode, in which fan air flows through the first path 24 at a reduced rate, or not at all, such that the compressor air in the second path 26 is cooled to a lesser extent, or not at all. In the described embodiment, the valve 30 is operated in the first mode when the aircraft is determined to be in a descent mode or if the turbine entry temperature (T30) of the high pressure turbine 16 is above a predetermined temperature. Otherwise, the valve 30 is turned to the second position, and the cooling system is operated in the second operating mode.

Figure 3:
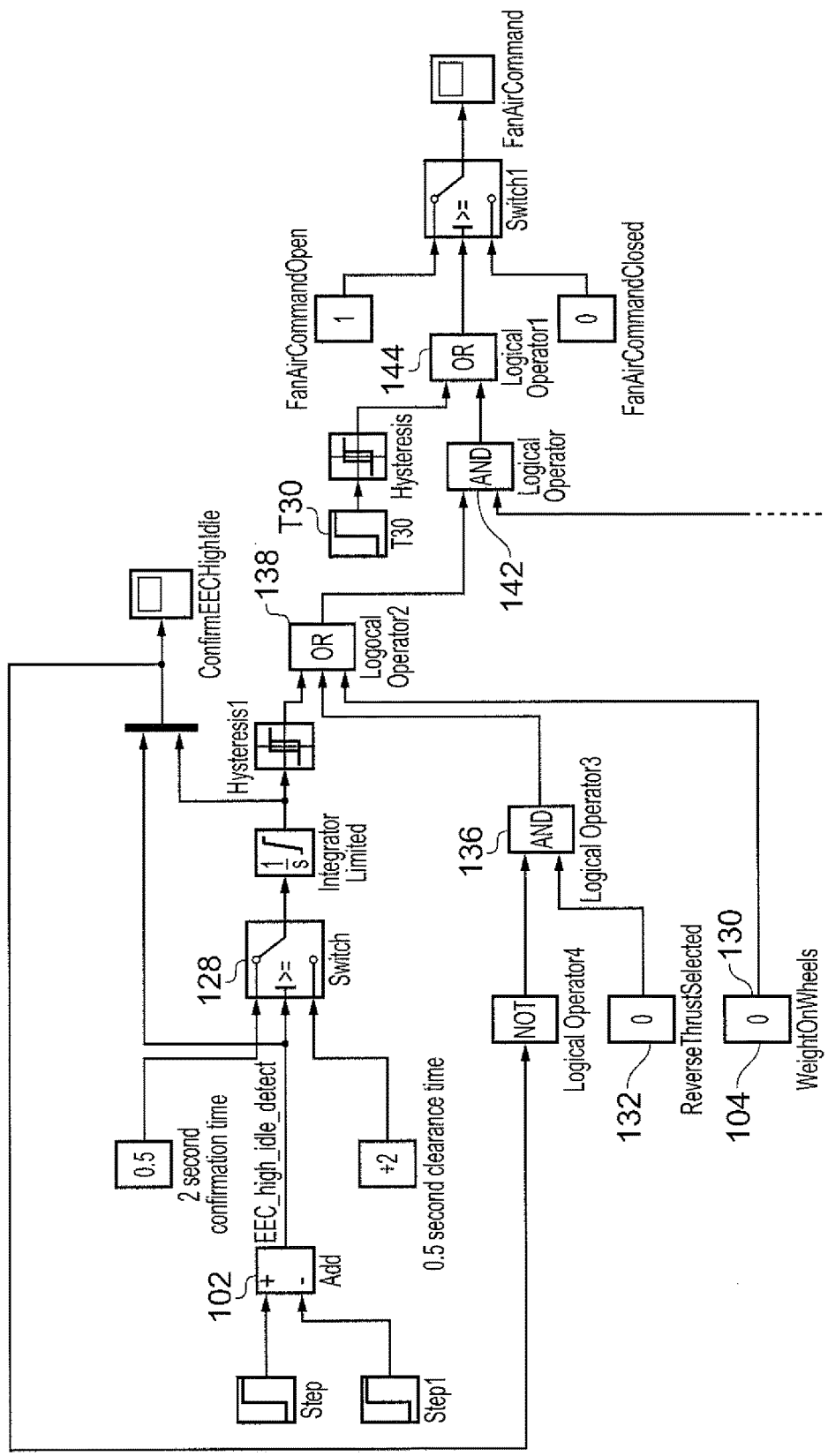
FIG. 3 is a control diagram exemplifying a method of controlling an aircraft gas turbine engine.
Figure 3:
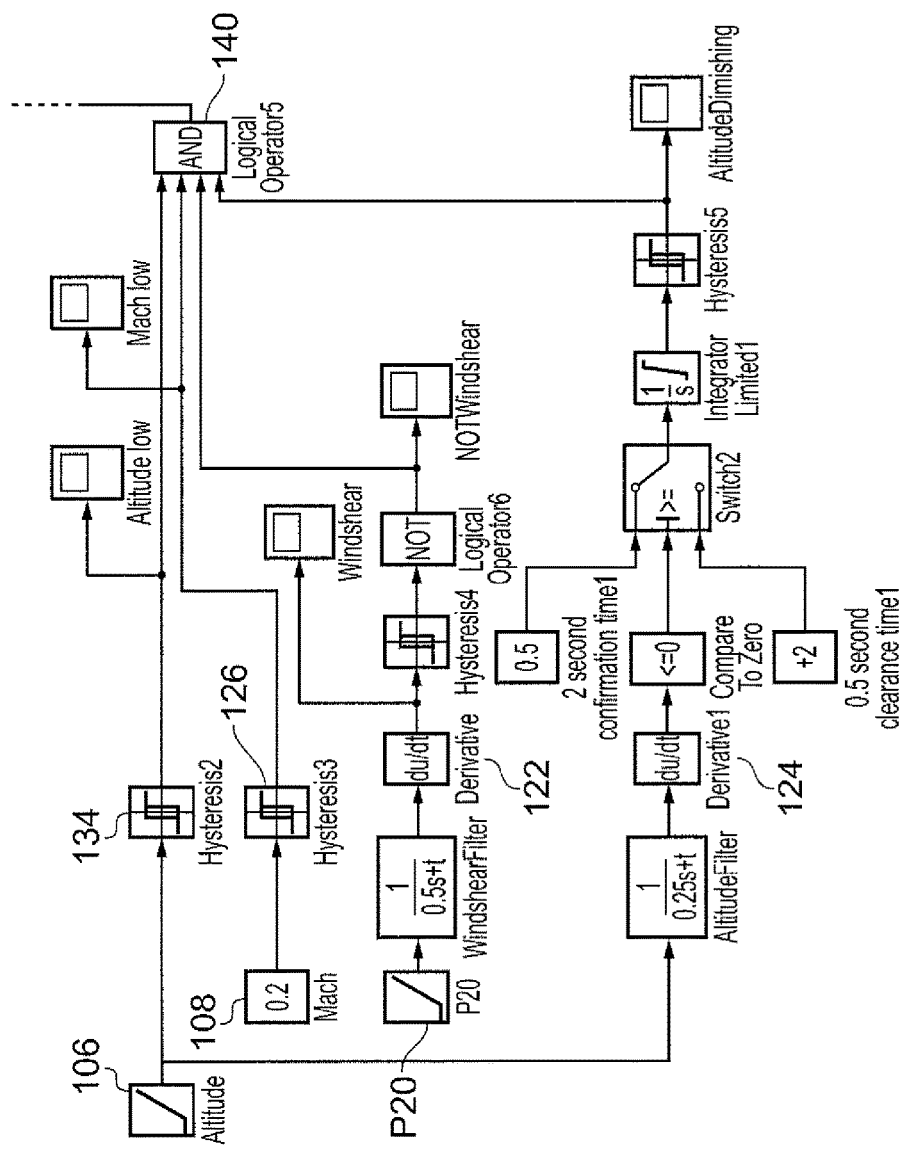

FIG. 3 provides an example of the logic followed by the controller 36 and is indicative of some of the factors which can be used to determine which operating mode the cooling system should be configured in to provide the desired cooling benefit. In this example, these factors include: throttle position 102, weight on wheels 104, altitude 106, aircraft Mach number 108, fan inlet total pressure P20, and turbine entry temperature T30, but it will be appreciated that others may be possible, depending on the cooling requirements to be achieved. Hence, in use, the controller 36 receives inputs from the aircraft which are indicative of the operating state of various components or systems, either directly or as part of a larger control system. In the present embodiment, each of the conditions is determined by a signal issued from a flight control computer (not shown) on the basis of one or more of the inputs 102-110 which are provided by conventional means.

A first factor for consideration comprises wind shear rate 110. The wind shear speed is calculated from P20. The wind shear u, is determined by applying the formula which represents a filter whose time constant 0.5 seconds is set near the bandwidth of a total pressure probe on the engine 10:

$$u = \frac{1}{0.5s + 1}$$

Where s is fan inlet total pressure P20. The wind shear rate is then determined by the derivative of u with respect to time:

wind shear rate=$du/dt$

The wind shear rate is compared to a predetermined value in a first comparison 122. If the wind shear speed is found to be above a predetermined value in the first comparison 122, then a wind shear condition is met.

A second factor is descent rate. Here, the altitude input 106 is used to determine whether a descent rate condition is met in a second comparison 124. The descent rate is compared to a predetermined value in the second comparison 124. If the descent rate is found to be above a predetermined value in the comparison 124, then a descent rate condition is met. As shown in FIG. 3, the descent detection logic includes an integrator which integrates the input to set output=true in 0.5 seconds, and output=clear in 2 seconds, depending on the orientation of the input to integrator. Hence, the integrator works like a fault integrator which sets in 0.5 seconds and clears in 2 seconds and prevents transitory changes in altitude (gusts etc) from affecting the detection of the flight mode.

The aircraft Mach number input 108 is used to determined whether an aircraft Mach number condition is met in a third comparison 126. If the aircraft Mach number is found to be within a predetermined range of values in the comparison 126, then a descent rate condition is met. In one example the predetermined range of Mach values is 0.3 to 0.1 which respectively correspond to high and low outputs for the comparator.

The throttle position 102 is used to determine a flight idle condition in a fourth comparison 128. In the fourth comparison 128, the throttle position 102 is compared to a predetermined value to determine whether the throttle position 102 corresponds to a predetermined value, and so corresponds to a flight idle condition. Typically, the EEC will provide the throttle position information and issue a signal which indicates that the flight idle condition is present or not. Hence, the control system shown in FIG. 3 will simply receive a corresponding high or low value.

The weight on wheels input 104 is used to determine whether a weight on wheels condition is met in a fifth comparison 130. In the fifth comparison 130, the weight on wheels input 104 is compared to a predetermined value. The weight on wheels condition is met when the weight on wheels input 104 exceeds a predetermined value. In another example, the weight on wheels input is a simple yes/no indication.

The throttle position 102 is also used to determine a reverse thrust condition in a sixth comparison 132. In the sixth comparison 132, the throttle position 102 is compared to a predetermined value to determine whether the throttle position corresponds to a predetermined value, and if so, the reverse thrust condition is met. Typically, the reverse thrust condition is determined by the EEC and a corresponding signal issued for the present control system.

The altitude input 106 is also used to determine whether an altitude condition is met in a seventh comparison 134. If the altitude is found to be within a predetermined range of values in the comparison 134, then an altitude condition is met. In one example, the predetermined range is between the limits of 1,800 meters and 1,500 meters, with the two values providing some hysteresis in the comparator. By "hysteresis" it will be understood that the separation of the values prevents the comparator from repeatedly switching between conditions as a result of small intermittent changes.

The result of the fourth and sixth comparisons 128, 132 (i.e. whether the flight idle condition is met, and the reverse thrust condition is met) are compared in an eighth comparison 136. The comparison 136 is met if the reverse thrust condition is met, and the flight idle condition is not met.

A ninth comparison 138 is made to determine whether a first indicator condition is met. In the comparison 138, the result of the eighth comparison 136 is compared to the results of the fourth and fifth comparisons 128, 130 (i.e. whether the flight idle and weight on wheels conditions respectively are met). The first indicator condition is met if any of the eighth comparison 136 result, reverse thrust, or weight on wheels conditions are met.

A tenth comparison 140 is made to determine whether a second indicator condition is met. In the comparison 140, the result of the first, second, third and seventh comparisons 122, 124, 126, 134 are compared (i.e. whether the altitude, Mach number, wind shear and descent rate conditions are met). The second indicator condition is met if all of the altitude, Mach number, wind shear and descent rate conditions are met.

The first and second indicators are then compared in an eleventh comparison step 142 to determine whether the aircraft is in a descent mode. If both the first and second indicator conditions are met, then the aircraft is determined to be in the descent mode.

The descent mode condition is then compared to a T30 input in a twelfth comparison step 144. If either T30 is determined to be greater than a predetermined value, or the descent mode condition is met, then the controller 36 opens the valve 30, such that the cooling system 20 is operated in the first operating mode. Otherwise, if both T30 is below the predetermined value, and the descent mode condition is not met, then the controller closes the valve 30 such that the cooling system 20 is operated in the second operating mode.

The above method is continually repeated, such that both the descent condition mode and T30 are continually monitored, and the cooling system is operated in the first or second mode accordingly.

The invention thereby provides a method of operating a cooling system according to a first or a second operating mode according to at least the descent mode of the aircraft. Accordingly, some or all of the main engines can be shut down on landing earlier than would otherwise be possible, thereby saving fuel without reducing engine life or increasing maintenance requirements.

By operating the cooling system in the first operating mode on descent, high thermal gradients in one or more turbine engine components (particularly the turbine discs) can be reduced or prevented. The method can also allow a steeper descent profile, thereby reducing noise on the ground during the descent, and also potentially reducing fuel use. The method is also safer than previous methods, since the engine components are cooler on landing, thereby reducing the risk of fire.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the descent mode could be detected by a direct signal sent from the flight computer on the basis of an assessment made by the flight computer, or a selection made by the pilot. In the latter case, the descent mode could be selected by the pilot prior to the aircraft descending.

A different cooling system could be used. For example, either or both of the first and second fluids could comprise oil or fuel. Alternatively the cooling system may not comprise a cooled cooling system comprising a heat exchanger having first and second fluid paths. Instead, the cooling system could comprise a valve configured to modulate the flow rate of the compressor air. In such a system, the valve would be configured to increase the flow rate in the first operating mode, and decrease the flow rate in the second operating mode.

The invention claimed is:

1. A method of controlling an aircraft gas turbine engine cooling system, the method comprising:
    assessing an aircraft flight mode; and
    operating the cooling system according to a first operating mode when the aircraft is determined to be in a descent mode,
    wherein the cooling system is configured to utilize cooling air to provide increased engine cooling to a turbine blade root when in the first operating mode relative to a second operating mode,
    wherein the cooling system comprises a heat exchanger, and the cooling system is operated to provide a relatively low temperature fluid flow at a first rate through the heat exchanger to cool a relatively higher temperature cooling fluid when operated in the first operating mode, and to provide the relatively low temperature fluid flow at a reduced rate through the heat exchanger when operated in the second operating mode, and
    wherein the relatively higher temperature fluid comprises cooling air provided by a compressor of the gas turbine engine.

2. The method according to claim 1, wherein the cooling system is operated to provide an increased flow of a cooling fluid or to provide a reduced temperature of the cooling fluid when in the first operating mode relative to the second operating mode.

3. The method according to claim 1, wherein the relatively low temperature fluid comprises one of fuel or air.

4. The method according to claim 1, wherein the flight mode is determined by assessing one or more inputs.

5. The method according to claim 4, wherein the one or more input comprises one or more of throttle position, weight on wheels, altitude, aircraft Mach number and fan inlet total pressure.

6. The method according to claim 1, wherein the aircraft is determined to be in the descent mode when both a first indicator condition and a second indicator condition are met.

7. The method according to claim 6, wherein the first indicator condition is met when any of a flight idle condition, reverse thrust condition, or weight on wheels condition is met.

8. The method according to claim 6, wherein the second indicator condition is met when each of an altitude condition, an aircraft Mach number condition, a wind shear condition and a descent rate condition is met.

9. The method according to claim 1, wherein the cooling system is operated in the first mode when either the aircraft is determined to be in a descent mode or the gas turbine engine turbine entry temperature is determined to be above a predetermined value.

10. The method according to claim 1, wherein the cooling system is configured to cool one or more of a rotor disc, a combustor casing and a nozzle guide vane.

11. A controller for a gas turbine engine cooling system, the controller being configured to carry out the method according to claim 1.

12. An aircraft gas turbine engine cooling system comprising the controller according to claim 11.

13. An aircraft gas turbine engine comprising the cooling system according to claim 12.

14. The method according to claim 1, wherein the relatively low temperature fluid comprises one of fuel or air.

* * * * *